United States Patent
Pap

(10) Patent No.: US 12,351,494 B1
(45) Date of Patent: Jul. 8, 2025

(54) HARMFUL ALGAE BLOOM MITIGATION SYSTEM

(71) Applicant: Florida Gulf Coast University Board of Trustees, Fort Myers, FL (US)

(72) Inventor: Levente Gyorgy Pap, Fort Myers, FL (US)

(73) Assignee: Florida Gulf Coast University Board of Trustees, Fort Myers, FL (US)

( * ) Notice: Subject to any disclaimer, the term of this patent is extended or adjusted under 35 U.S.C. 154(b) by 390 days.

(21) Appl. No.: 18/181,137

(22) Filed: Mar. 9, 2023

Related U.S. Application Data

(60) Provisional application No. 63/317,989, filed on Mar. 9, 2022.

(51) Int. Cl.

| | |
|---|---|
| B01D 53/047 | (2006.01) |
| B01F 23/231 | (2022.01) |
| B01F 23/237 | (2022.01) |
| B01F 23/2375 | (2022.01) |
| C02F 1/72 | (2023.01) |

(Continued)

(52) U.S. Cl.
CPC ............ *C02F 1/727* (2013.01); *B01D 53/047* (2013.01); *B01F 23/23121* (2022.01); *B01F 23/231231* (2022.01); *B01F 23/2375* (2022.01); *B01F 23/237612* (2022.01); *B01D 2256/12* (2013.01); *B01D 2257/102* (2013.01); *B01F 2101/305* (2022.01); *B01F 2215/0422* (2013.01); *B01F 2215/0427* (2013.01);

(Continued)

(58) Field of Classification Search
CPC .............. B01D 53/047; B01D 2256/12; B01D 2257/102; B01F 23/23121; B01F 23/231231; B01F 23/2375; B01F 23/237612; B01F 2101/305; B01F 2215/0422; B01F 2215/0427; B01F 2215/0431; C02F 1/727; C02F 2103/007; C02F 2303/04; G01N 21/65
See application file for complete search history.

(56) References Cited

U.S. PATENT DOCUMENTS

2021/0106957 A1 * 4/2021 Tsuchiya ................. B01F 25/25

FOREIGN PATENT DOCUMENTS

CN 104294793 B * 2/2016 ............. E02B 1/003

OTHER PUBLICATIONS

EasyPro Pond Products ("Air diffuser manifold DM2, DM4, DM6 assembly/installation"). Youtube video. https://www.youtube.com/watch?v=6DyNa46bCxk. Aug. 11, 2016.*

(Continued)

*Primary Examiner* — Benjamin L Lebron
(74) *Attorney, Agent, or Firm* — Paul Murty; Smith & Hopen, P.A.

(57) ABSTRACT

A large-scale harmful algae bloom mitigation system that is environmentally safe, cost-effective, and scalable utilizing a hyperoxic nanobubble treatment and remote brevetoxin screening, without relying on heavy laboratory equipment. The hyperoxic nanobubble treatment and remote brevetoxin screening system is configured for installation within a narrow cross-section of an area of a body of water. The system is a stationary, high oxygen concentration, gas flow system that injects a large amount of oxygen enriched nanobubbles underwater at a small cross-section of a body of water, thereby controlling a large amount of water rapidly and in an environmentally-safe manner.

20 Claims, 13 Drawing Sheets

(51) Int. Cl.
  *B01F 101/00*  (2022.01)
  *C02F 103/00*  (2006.01)
  *G01N 21/65*  (2006.01)

(52) U.S. Cl.
  CPC . *B01F 2215/0431* (2013.01); *C02F 2103/007* (2013.01); *C02F 2303/04* (2013.01); *G01N 21/65* (2013.01)

(56) References Cited

OTHER PUBLICATIONS

Canadianpond.ca ("Introducing Canadianpond.ca"). Youtube video. https://www.youtube.com/watch?v=wfJkEOVsj_4&t=29s. Oct. 10, 2019.*

Machine translation of CN 104294793. May 26, 2025.*

Li, H.; Hu, L.; Song, D.; Al-Tabbaa, A. Subsurface Transport Behavior of Micro-Nano Bubbles and Potential Applications for Groundwater Remediation. International Journal of Environmental Research and Public Health. 2014, pp. 473-486.

Meegoda, J. N.; Aluthgun Hewage, S.; Batagoda, J. H. Stability of Nanobubbles. Environ. Eng. Sci. 2018, 35 (11), 1216-1227.

\* cited by examiner

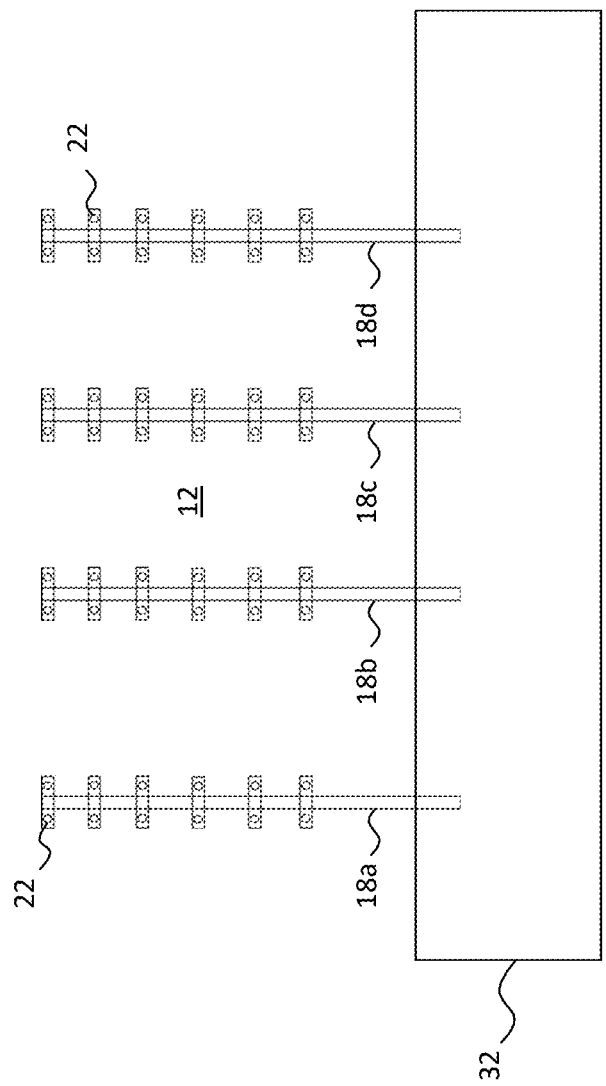

Fig. 8

HARMFUL ALGAE BLOOM MITIGATION SYSTEM

CROSS-REFERENCE TO RELATED APPLICATIONS

This nonprovisional application claims priority to provisional application No. 63/317,989, entitled "A novel harmful algae bloom mitigation system: an environmentally safe, hyperoxic nanobubble treatment of large waters and remote brevetoxin screening," filed on Mar. 9, 2022, by the same inventor, the entirety of which is incorporated herein by reference.

BACKGROUND OF THE INVENTION

1. Field of the Invention

This invention relates, generally, to algae bloom mitigation systems. More specifically, it relates to a harmful algae bloom mitigation system utilizing a hyperoxic nanobubble treatment and remote brevetoxin screening.

2. Brief Description of the Prior Art

Annually occurring harmful algae blooms (HABs) produce toxins which cause a variety of illnesses in people; kill fish, mammals, and birds; destroy water quality; and cause negative economic conditions. For example, during the last few decades, the state of Florida has experienced an increase in large, environmentally damaging HABs caused by *Karenia brevis* with an average estimated annual cost of approximately $82 million. Moreover, in 2011, a "super bloom" caused a $235-470 million potential loss to Florida's economy. The toxic impacts of HABs result from the proliferation of, for example, *Karenia brevis* photosynthetic organisms, producing large amounts of natural toxins, called brevetoxins. Once brevetoxins are consumed by filter-feeding organisms, accumulation takes place which may cause toxicity in marine animals and humans upon consumption. Brevetoxins can also be transferred from wind-powered whitecapped waves to the atmosphere via water and salt particles. Inhalation of brevetoxins containing aerosol may cause respiratory problems and serious illnesses.

Existing mitigation and alleviation strategies for HABs include directly controlling or indirectly controlling HAB formation and toxin production. Indirect methodologies mitigate environmental impacts and public health implications, and include monitoring programs. However, while such rigorous screening is essential to mitigate HABs, monitoring on a sufficient scale is laborious, expensive, and requires widespread use of heavy laboratory equipment. Attempts have been made to utilize remote sensing technologies; however, remote technologies to date have proven to be difficult to build due to engineering obstacles and costly components, as well poor detection limits of remote instruments.

Accordingly, what is needed is a large-scale harmful algae bloom mitigation system that is environmentally safe, cost-effective, and scalable utilizing a hyperoxic nanobubble treatment and remote brevetoxin screening, without relying on heavy laboratory equipment. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a harmful algae bloom mitigation system is now met by a new, useful, and nonobvious invention.

The novel hyperoxic nanobubble water treatment system includes a first end proximate to a first shoreline of a body of water, and a second end opposite the first end, with the second end being proximate to a second shoreline of the body of water. In an embodiment, the first end and the second end of the system are spaced apart by a length of 10-1000 meters. In an embodiment, at least one of the first end and the second end is disposed on at least one of the first shoreline and the second shoreline.

A nanobubble generator spans from the first end to the second end, with the nanobubble generator including a linear tube disposed between the first end and the second end. In an embodiment, the linear tube extends from the first end to the second end of the system. In an embodiment, the linear tube includes a length of between 10 meters and 30 meters. An embodiment of the linear tube includes a first portion having a first diameter and a second portion having a second diameter, the second diameter being smaller than the first diameter, thereby creating a gradient from the first portion to the second portion of the linear tube.

The linear tube defines at least one aperture therein, and at least one nozzle is disposed through the at least one aperture defined by the linear tube. In an embodiment, a plurality of apertures are defined within the linear tube. In an embodiment, the system includes a plurality of nozzles, with each of the plurality of nozzles disposed through one of the plurality of apertures defined within the linear tube.

The at least one nozzle extends in a direction away from the linear tube and into the body of water. In an embodiment, each of the at least one nozzle includes a diameter of between 5 nanometers and 500 nanometers. In an embodiment, each of the at least one nozzle is angled with respect to the linear tube, the angle being between 45° and 135°.

In an embodiment, the system includes a plurality of linear tubes disposed between the first end and the second end, with each of the plurality of linear tubes defining at least one aperture therein, and with a nozzle disposed through each of the at least one aperture of each of the plurality of linear tubes. An embodiment of the system includes each of the plurality of linear tubes being arranged proximate to at least one of the plurality of linear tubes, such that the plurality of linear tubes are arranged in a sequential series. Another embodiment of the system includes at least one of the plurality of linear tubes is disposed within another of the plurality of linear tubes.

The nanobubble generator, via the at least one nozzle, generates a plurality of hyperoxic nanobubbles and ejects the plurality of hyperoxic nanobubbles into the body of water, such that each of the plurality of hyperoxic nanobubbles forms an absorption and reaction site on a surface thereof to bind to a brevetoxin cell, thereby reducing brevetoxin growth and photosynthesis. An embodiment of the nanobubble generator is stationary within the body of water.

In an embodiment, the nanobubble generator includes a pressure swing adsorption separation system that utilizes an air input and separates oxygen from nitrogen within the air input, thereby generating a high concentration hyperoxic oxygen nanobubble output. An embodiment of the system includes a tank including an air mixture, with the tank being fluidically coupled to the nanobubble generator. In an embodiment, the tank is disposed on at least one of the first shoreline and the second shoreline. An embodiment of the system includes a pump intermediately secured to the tank and to the nanobubble generator, the pump configured to receive the air mixture from the tank and transmit the air mixture to the nanobubble generator.

In an embodiment, the system includes a portable screening device disposed on at least one of the first shoreline and the second shoreline, the portable screening device in electronic communication with the nanobubble generator. The portable screening device includes a Raman spectroscopy component to detect a presence of a brevetoxin within the body of water.

An object of the invention is to mitigate the propagation and effects of harmful algae blooms at scale using utilizing a hyperoxic nanobubble treatment and remote brevetoxin screening, without relying on environmentally-harmful chemicals, unsustainable treatments, and heavy laboratory equipment.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 5B is a perspective isolated view of a nanobubble generator including a plurality of approximately linear tubes that are spaced apart, in accordance with an embodiment of the present invention.

FIG. 8 is a schematic view showing the use of surface enhanced Raman spectra to identify toxins in the presence of a mixture of thiourea and acid, in accordance with an embodiment of the present invention.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to +15% of the numerical; it should be understood that a numerical including an associated range with a lower boundary of greater than zero must be a non-zero numerical, and the term "about" should be understood to include only non-zero values in such scenarios.

The present invention includes a hyperoxic nanobubble treatment and remote brevetoxin screening system that is configured for installation within a body of water, such as a narrow cross-section of an area of a body of water. The system is a stationary, high oxygen concentration, gas flow system that injects a large amount of oxygen enriched nanobubbles underwater at a small cross-section of a body of water, thereby controlling a large amount of water rapidly and in an environmentally-safe manner. Embodiments of the system will be described in greater detail in the sections herein below.

Figure 1:
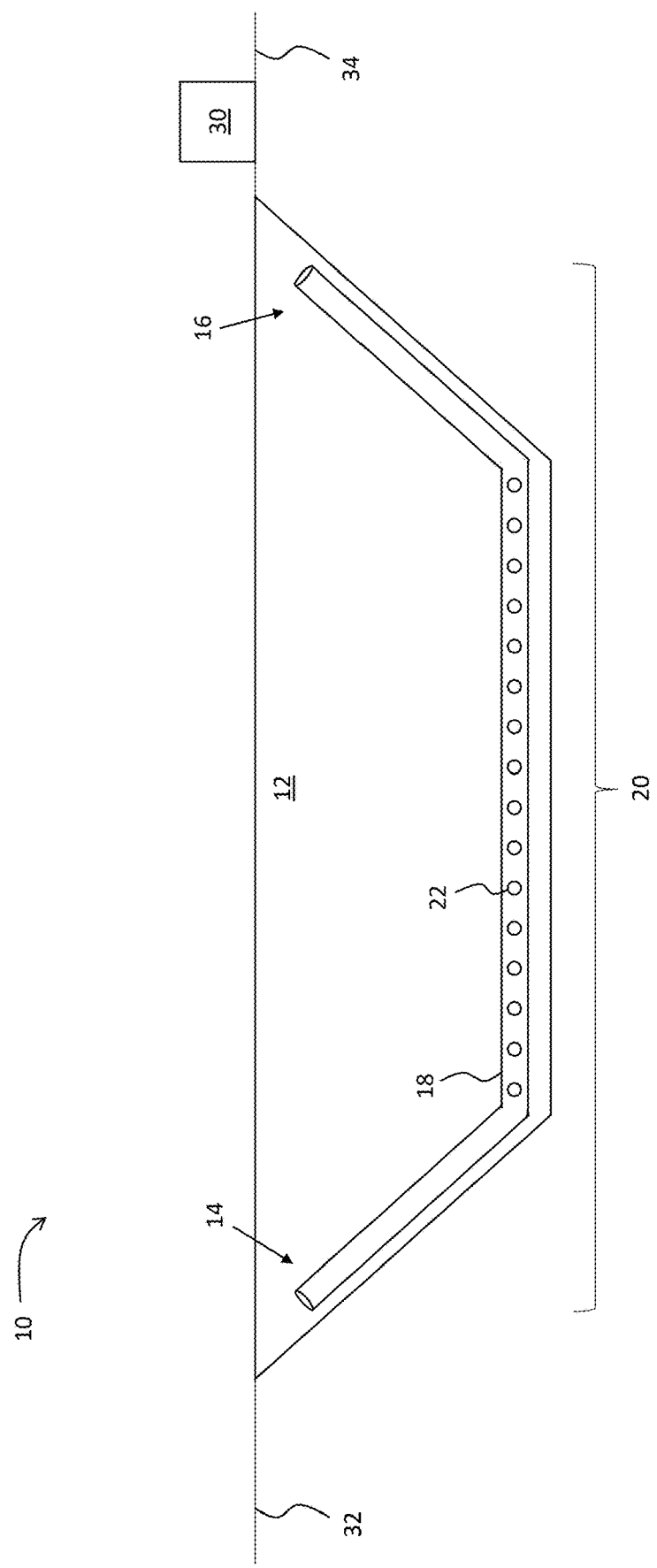
FIG. 1 is a perspective view of a hyperoxic nanobubble treatment and remote brevetoxin screening, in accordance with an embodiment of the present invention.

As shown in FIG. 1, hyperoxic nanobubble treatment and remote brevetoxin screening system 10 (alternatively referred to as system 10) is configured for installation within body of water 12. System 10 includes first end 14 opposite second end 16; in an embodiment, first end 14 is separated from second end 16 by a length of approximately between 10 m and 1,000 m to define a lateral expanse of system 10, In an embodiment, first end 14 of system 10 is proximate to first shoreline 32 of body of water 12, and second end 16 of system 10 is proximate to second shoreline 34 of body of water 12. As such, embodiments of system 10 are secured to opposing shorelines 32, 34 (such as via a winch and a cable disposed at opposing first and second ends 14, 16 of system 10), thereby allowing system 10 to be installed, removed, and reinstalled within body of water 12. In other embodiments, at least one of first end 14 and second end 16 is disposed on a shoreline; for example, in an embodiment, first end 14 is disposed on first shoreline 32, with second end 16 being disposed within body of water 12. It should be appreciated that embodiments of system 10 can include second end 16 being disposed on second shoreline 34, and can include first end 14 being disposed on first shoreline 32 and second end 16 being disposed on second shoreline 34. In addition, in an embodiment, system 10 is anchored to a floor of body of water 12 to further stabilize system 10, such that system 10 is approximately stationary during a flow of water within body of water 12.

System 10 includes nanobubble generator 20 spanning from first end 14 to second end 16. Nanobubble generator 20 includes linear tube 18 disposed between first end 14 and second end 16, with linear tube 18 defining at least one aperture therein. Nanobubble generator 20 also includes at least one nozzle 22 (alternatively referred to as a plurality of nozzles 22 in embodiments including more than one nozzle 22) that is receivable through the at least one aperture, such that nozzle 22 extends in a direction away from linear tube 18 and extends at least partially into body of water 12. In an embodiment, nozzle 22 includes a lateral expanse of between approximately 5 mm and 500 mm.

Figure 5A:
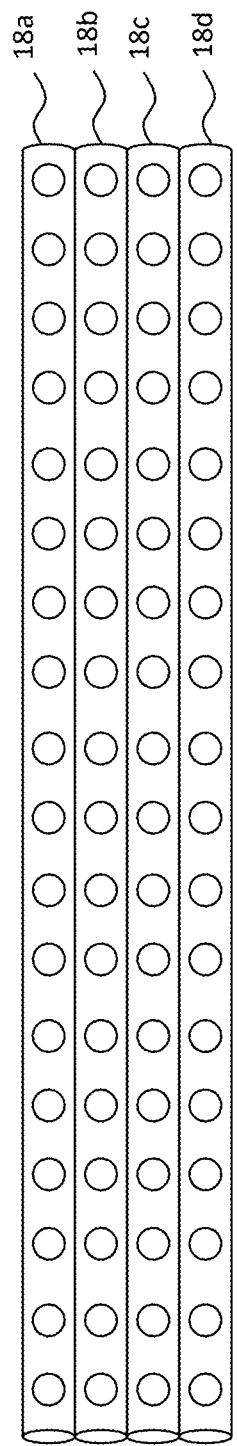
FIG. 5A is a perspective isolated view of a nanobubble generator including a plurality of approximately linear tubes that are adjacent, in accordance with an embodiment of the present invention.
Figure 5C:
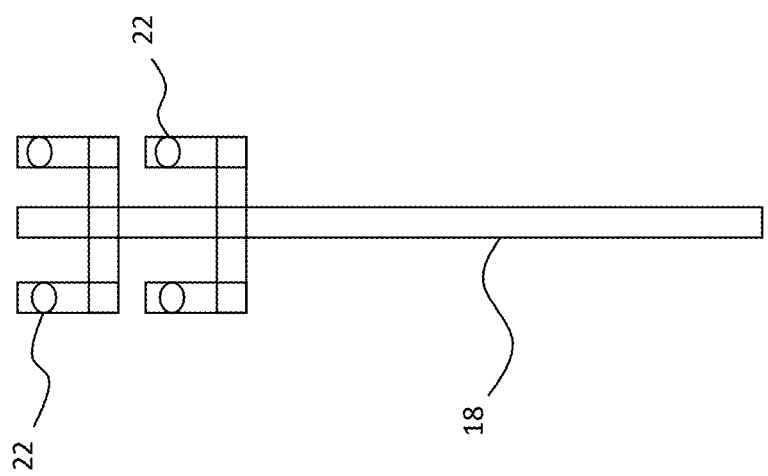
FIG. 5C is a perspective isolated view of a nanobubble generator including nozzles arranged in a parallel configuration to one another on opposing sides of an approximately linear tube, in accordance with an embodiment of the present invention.

In an embodiment, nozzle 22 extends approximately perpendicularly away from linear tube 18 (i.e., an embodiment of nozzle 22 is oriented at an angle of approximately 90° with respect to linear tube 18); however, it should be appreciated that other angles of nozzle 22 with respect to linear tube 18 are contemplated (i.e., angles between approximately 0° and 180° with respect to linear tube 18, including an approximately 45° angle, an approximately 120° angle, and an approximately 135° angle, as well as a parallel configuration of nozzles 22 as shown in particular in FIG. 5C), so long as nozzle 22 extends through an aperture and in a direction away from linear tube 18. Each nozzle 22 is capable of bubble delivery within body of water 12, such as through pressurized dissolution, rotational flow, turbulent static mixing, ejector nozzles, ultrasonic vibrations, oscillation, venturi systems, mixed vapor direct contact condensation, and similar delivery methods. While the embodiment of system 10 shown in FIG. 1 includes linear tube 18 spanning partially between first end 14 and second end 16, it should be appreciated that embodiments of system 10 can include linear tube 18 extending from first end 14 to second end 16.

Nanobubble generator 20 is capable of injecting billions of charged nanoparticles per cubic millimeter, dissolving oxygen with a 90% efficiency; accordingly, nanobubble generator 20 is configured to inject nanobubbles of enriched air into body of water 12. Enriched air is helpful for humans and other animals, but has a negative effect on algae, since high oxygen concentrations reduce algae growth and photosynthesis, ultimately decreasing the number of algae cells in water without directly killing algae cells. As such, system 10, via nanobubble generator 20, injects nanobubbles into body of water 12 to reduce algae growth while maintaining a presence of algae within body of water 12, thereby contributing to a healthier ecosystem by maintaining the helpful presence of an amount of algae within body of water 12.

Exhaled bubbles are different in size and have unique physical and chemical properties—larger bubbles have a small surface area, rising rapidly within a body of water (such as body of water 12), resulting in low oxygen conversion rate between the gas and liquid phases. However, since nanobubbles are ultrafine bubbles that can stay underwater for weeks, nanobubbles generated via nanobubble generator 20 possess 1000× greater surface area/mL as compared to larger bubbles created without the use of nozzle 22, and are capable of increasing oxygen conversion of the bubbles by 800% as compared to larger bubbles created without the use of nozzle 22 (Li 2014; Meegoda 2018); in an embodiment, nanobubbles generated via nanobubble generator 20 include a diameter of approximately between 40 nm and 300 nm. Research has shown that an average size of 90 nm of bubbles can remain intact for a long period of time (such as between 1-2 weeks), and the bubbles include a large surface area to transfer a large amount of oxygen. A high stagnation time of bubbles underwater within body of water 12 increases physical absorptions and chemical reactions on the surface of the bubbles, ultimately aiding the oxygen transport between the gas and liquid phase. Moreover, nanobubbles can exist for several weeks in an aqueous solution since the electrically charged liquid-gas interface of nanobubbles creates repulsive forces that prevent bubble coalescence.

Enriched air can be produced via nanobubble generator 20 in different ways; in an embodiment, pressure swing adsorption is utilized to produce a large amount of hyperoxic air for system 10. Hyperoxia occurs when organisms, cells, and tissues are exposed to an excess amount of oxygen or a higher-than-normal partial pressure of oxygen. System 10 uses a large amount of oxygen during the proliferation reduction process of algae, with air serving as the gas mixture as the initial gas and oxygen are separated from the nitrogen gas as a product. In an embodiment, system 10 converts air including approximately 78% $N_2$, 21% $O_2$, and 1% other gases (such as $CO_2$) into an $O_2$ concentration of greater than approximately 90%, and an $N_2$ and other gas concentration of less than approximately 10%. In another embodiment, system 10 converts an air mixture to include a concentration of $O_2$ gas of at least 80%.

In an embodiment, pressure swing adsorption is used for the separation within system 10. Pressure swing adsorption utilizes high pressure to trap gases onto solid surfaces as air passes alternatively over a molecular sieve that is designed to adsorb nitrogen. The reusable adsorption bed can be recovered and used continuously; an additional advantage is that a high concentration of oxygen can be generated for use within system 10. However, it should be appreciated that other separation systems can be used within system 10, including membrane separation.

Figure 2:
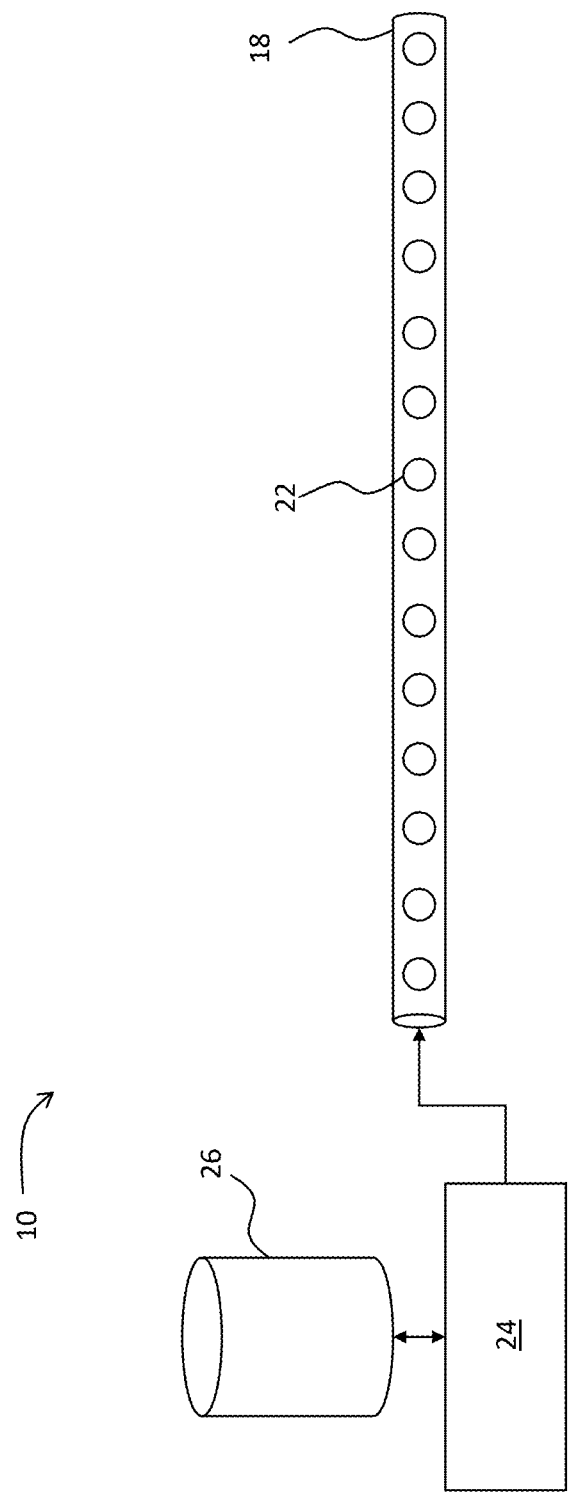
FIG. 2 is a perspective view of a hyperoxic nanobubble treatment and remote brevetoxin screening showing a tank, a pump, and a nanobubble generator, in accordance with an embodiment of the present invention.

Turning to FIG. 2, embodiments of system 10 include one or more subunits. In an embodiment, pump 24 utilizes air stored within tank 26 to generate a desired gas mix that is pumped into linear tube 18. In an embodiment, pump 24 is disposed on at least one of first shoreline 32 and second shoreline 34. Embodiments of the gas mix include oxygen and nitrogen gases; however, it should be appreciated that other gases can be used alone or in combination, including trace amounts of gases such as argon and carbon dioxide. In an embodiment, a high oxygen concentration is generated including a 100 ultra-high purity $O_2$ gas directly connected to a gas tank, such as tank 26; it should be appreciated that oxygen can also be concentrated from atmospheric gases. In an embodiment, pump 24 delivers the gas mixture to linear tube 18 at a pressure of approximately between 1 bar and 10 bar, and at a flow rate of approximately between 0.1 liters/minute and 30 liters/minute.

Figure 3:
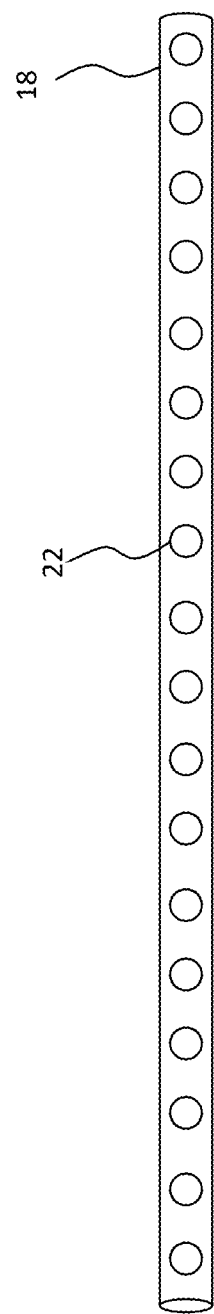
FIG. 3 is a perspective isolated view of a nanobubble generator including an approximately consistent diameter throughout a length thereof, in accordance with an embodiment of the present invention.
Figure 4:
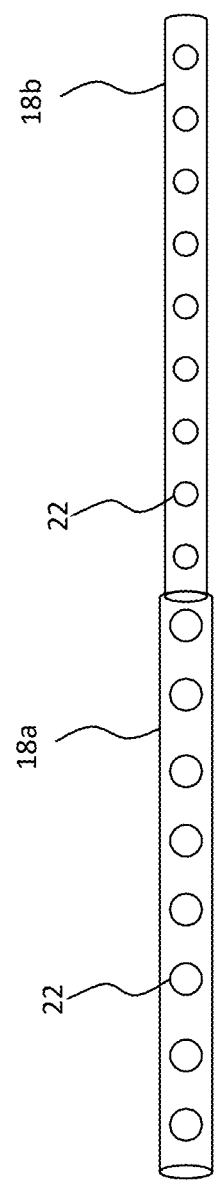
FIG. 4 is a perspective isolated view of a nanobubble generator including different diameters throughout a length thereof, in accordance with an embodiment of the present invention.

As shown in FIGS. 3-6, different embodiments of nanobubble generator 20 include different orientations of linear tube 18. For example, in an embodiment (as shown in FIG. 3), nanobubble generator 20 includes a single linear tube 18 including a plurality of nozzles 22, with linear tube 18 including an approximately consistent diameter throughout a length of linear tube 18. However, as shown in FIG. 4, an alternative embodiment of nanobubble generator 20 includes first linear tube portion 18a and second linear tube portion 18b, with first linear tube portion 18a having a greater diameter than second linear tube portion 18b (forming a gradient tube). Moreover, as shown in FIG. 5A, an embodiment of nanobubble generator 20 includes a plurality of linear tubes 18a, 18b, 18c, and 18d; while the plurality of linear tube tubes 18a, 18b, 18c, and 18d are shown having an approximately equal diameter and length, it should be appreciated that one or more of the plurality of linear tube tubes 18a, 18b, 18c, and 18d can vary in diameter and/or length as compared to other linear tubes in the plurality of linear tubes 18a, 18b, 18c, and 18d. Similarly, as shown in FIG. 5B, an embodiment of nanobubble generator 20 includes a plurality of linear tubes 18a, 18b, 18c, and 18d that are each spaced apart from and independent from the remaining plurality of linear tubes, with an end of each of the plurality of linear tubes 18a, 18b, 18c, and 18d being disposed on a shoreline (such as first shoreline 32, as shown in FIG. 5B, although it should be appreciated that the plurality of linear tubes 18a, 18b, 18c, and 18d can be at least partially disposed on second shoreline 34). Moreover, as shown in FIG. 5C, nozzles 22 can be arranged parallel to one another in a branching relationship to linear tube 18.

Figure 6:
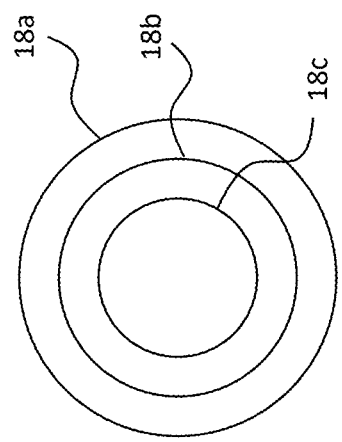
FIG. 6 is a section view of a nanobubble generator, in accordance with an embodiment of the present invention.
Figure 7:
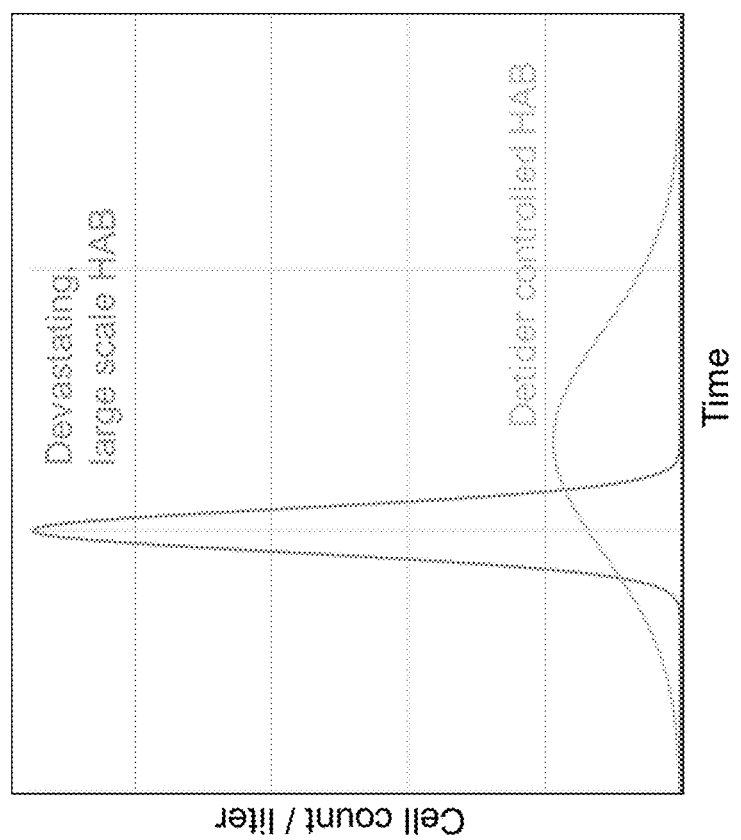
FIG. 7 depicts a graphical comparison of untreated and treated water, plotting algae cell counts per liter over time, in accordance with an embodiment of the present invention.

Turning to FIG. 6, embodiments of nanobubble generator 20 include linear tube 18c embedded within linear tube 18b, such that linear tube 18c includes a diameter that is smaller than a diameter of linear tube 18b. Moreover, embodiments of nanobubble generator 20 include linear tube 18b embedded within linear tube 18a, such that linear tube 18b includes a diameter that is smaller than a diameter of linear tube 18a. In an embedded linear tube 18 system, any kind of gas and liquid mixture at any pressure can be delivered. Linear tube(s) 18 may be connected multiple times and the length of any one linear tube 18 can span between approximately 10 m and 30 m. Linear tube(s) 18 may be connected through an isobaric or gradient pressure fashion. For example, in the case of an isobaric tube, the pressure in linear tube 18 is equal at any point. In the case of gradient tubing, the diameters of different portions of linear tube(s) 18 may be modified to create a delivery system to provide the desired pressure of the gas.

As noted above, system 10 is configured for installation within body of water 12. The position of system 10 within body of water 12 is important given that narrow cross-sections of areas of body 12 including enriched air bubbles increase waterflow rates, acting as a funnel for the waterflow (whereas in larger areas of water, the enriched air bubbles intermix at a lower flow rate). As such, system 10 is positioned at narrow water flow ports, such as small passes or water inlets (such as those between the Gulf of Mexico and bay areas) through nanobubble generator 20. Naturally occurring tides in such narrow water flow bodies of water 12 continuously move water therethrough to completely exchange bay water every 5-6 days.

In particular, since system 10 is stationary and does not include propelling units, such as underwater turbines, system 10 is designed to utilize natural tidal movements to generate nanobubbles via nanobubble generator 20. Since high and low tides move a large amount of water within body of water 12 over a small cross-section, an example of body of water 12 includes Sarasota Bay (or a substantially equivalent body of water) which spans an area of approximately 91.1 $km^2$ at an average depth of 2 m. The average volume of such an example of body of water 12 is approximately $1.82 \times 10^8$ $m^3$. The mean range of tides in such an example of body of water 12 is approximately 0.38 m; as such, a total of $3.5 \times 10^7$ $m^3$ of water can be filtered within body of water 12 during a single tidal cycle, representing approximately 20% of the total volume in body of water 12. Placement of system 10 within such an example of body of water 12 is such that system 10 operates at a small cross-section of a body of water, thereby controlling a large amount of water rapidly and in an environmentally-safe manner.

In addition, in an embodiment, system 10 spans approximately 200 m from first end 14 to second end 16 within body of water 12 having an average depth of approximately 3.6 m, with a high tide water flow rate of approximately 0.27 m/s. Within such an embodiment, system 10 can treat an average volume of approximately 11,664 $m^3$/min, generating approximately $100 \times 10^3$ nanobubbles/liter.

Figure 8:
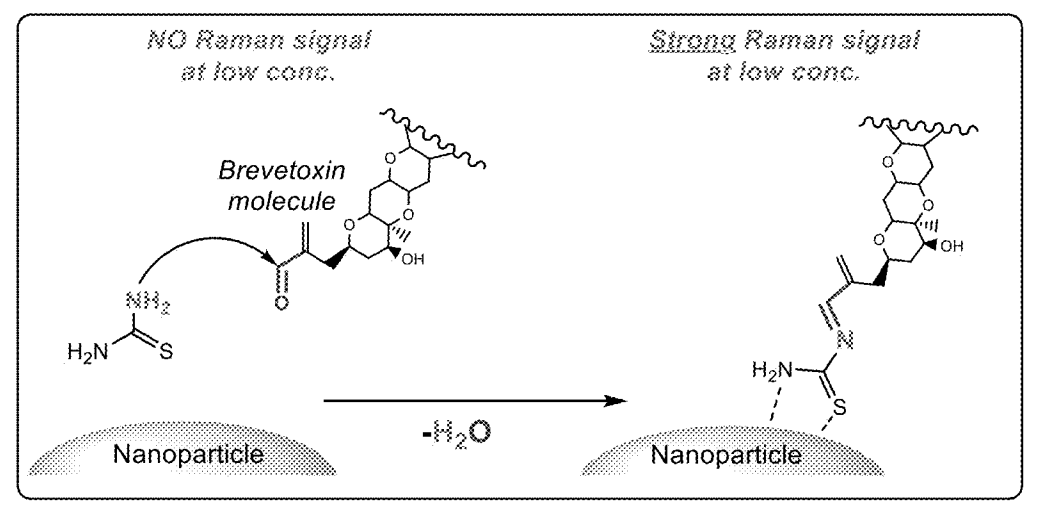

In embodiments, system 10 includes portable screening device 30 (as shown in FIG. 1, with portable screening device 30 being disposed on second shoreline 34); in an embodiment, portable screening device 30 utilizes Raman spectroscopy (including a surface enhanced Raman scattering technique, alternative known as SERS). While SERS has been used in other industries to identify items such as pharmaceuticals, pesticides, toxins, and heavy metals, SERS have not been extended for use in the detection of brevetoxins. As such, as shown in FIG. 8, portable screening device 30 includes nanoparticles (such as gold or silver nanoparticles) to create binding sites for brevetoxin samples within portable screening device 30. When portable screening device 30 receives a sample (such as via a strip of hydrophilic paper, such as cotton), any brevetoxin molecules within the sample interact with the nanoparticles within portable screening device 30, generating a strong signal enhancement that is detectable via a laser light emitted from portable screening device 30.

EXPERIMENTAL METHOD

Portable screening device 30 was tested to determine whether brevetoxins could be identified by portable screening device 30 in a field-based setting. Silver colloidal nanoparticles were synthesized, with a final product being a greyish-yellow colloid in methanol, which was deposited on the surface of small paper strips. During the experimental method, one brevetoxin solution was utilized, containing five major brevetoxins (PbTx-1, PbTx-2, PbTx-3, PbTx-CBA, and Brevenal). After the deposition and after a ten-minute drying period, SERS Raman spectra were acquired via portable screening device 30 of the background, the brevetoxins with a low concentration of silver nanoparticles, and the brevetoxins with a high concentration of silver nanoparticles (as shown graphically in FIGS. 9A-9B).

Figure 9A:
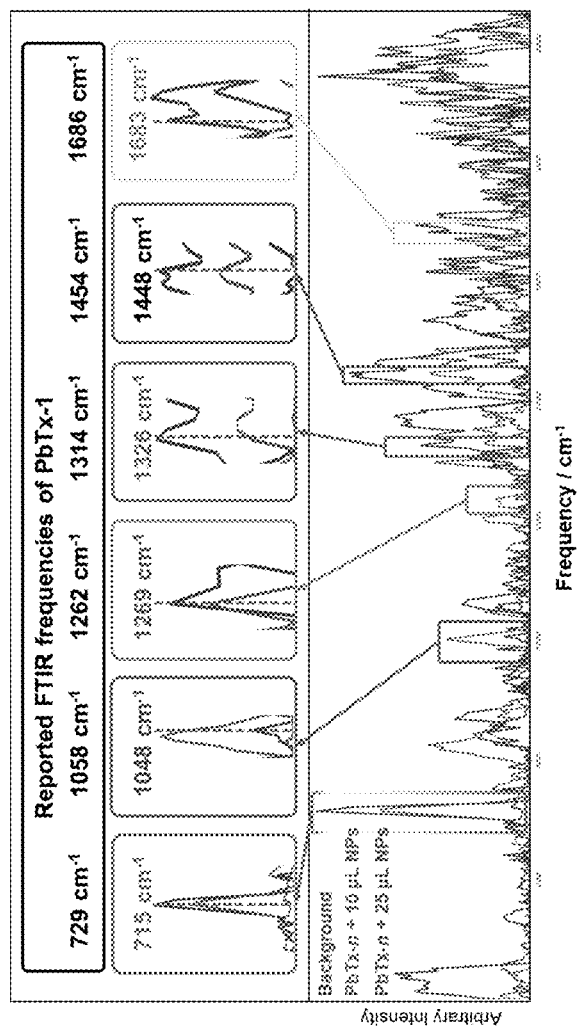
FIG. 9A is a graphical representation showing results of brevetoxin Raman spectra, in accordance with an embodiment of the present invention.
Figure 9B:
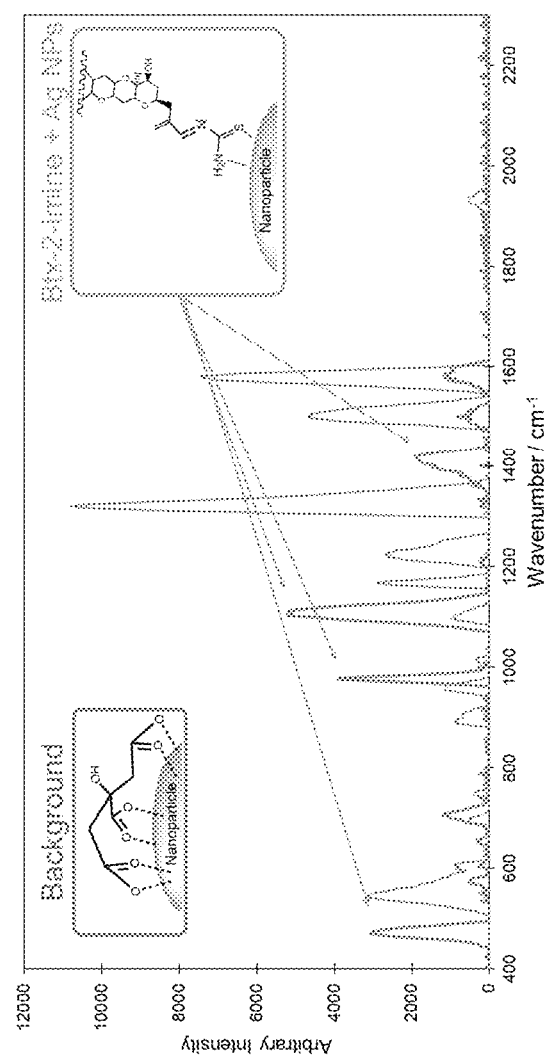
FIG. 9B is a graphical representation showing results of brevetoxin Raman spectra, in accordance with an embodiment of the present invention.
Figure 10:
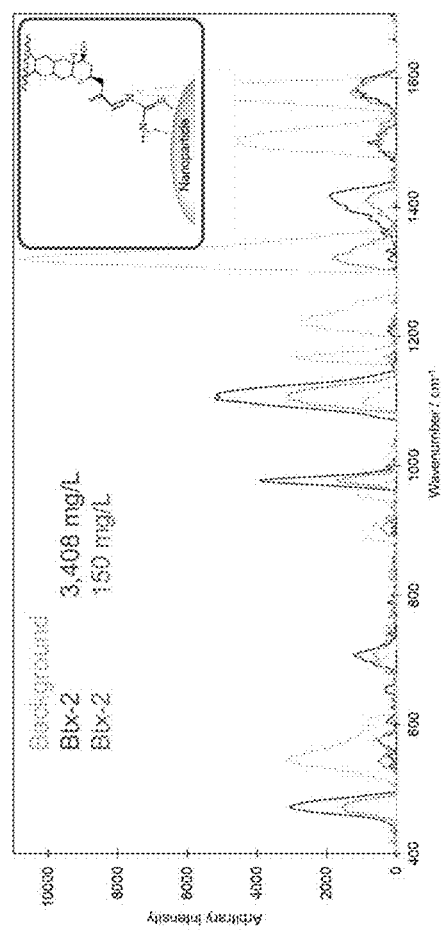
FIG. 10 is a graphical representation showing results of brevetoxin Raman spectra, in accordance with an embodiment of the present invention.

To confirm that the signals detected by portable screening device 30 were produced by the brevetoxins, prior research results were compared to the results shown in FIGS. 9A-9B. For example, ten different characteristic vibrational modes were observable as shown in FIG. 8, including at 715, 1048, 1088, 1209, 1269, 1326, 1376, 1448, 1683, and 1783 $cm^{-1}$. The ten published vibrational frequencies for brevetoxins are 729, 1058, 1080, 1206, 1262, 1314, 1374, 1454, 1686, and 1790 $cm^{-1}$, thereby indicating a match between the brevetoxins identified via portable screening device 30 and those known in prior research. In addition, as shown in FIG. 10, brevetoxins were identified via portable screening device 30 at the approximately 150 ppm concentration level.

REFERENCES

Li, H.; Hu, L.; Song, D.; Al-Tabbaa, A. Subsurface Transport Behavior of Micro-Nano Bubbles and Potential Applications for Groundwater Remediation. International Journal of Environmental Research and Public Health. 2014, pp 473-486.

Meegoda, J. N.; Aluthgun Hewage, S.; Batagoda, J. H. Stability of Nanobubbles. Environ. Eng. Sci. 2018, 35 (11), 1216-1227.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A hyperoxic nanobubble water treatment system for use within a body of water, the system comprising:
    a first end proximate to a first shoreline of the body of water, and a second end opposite the first end, the second end proximate to a second shoreline of the body of water; and
    a nanobubble generator spanning from the first end to the second end, the nanobubble generator including:
        a linear tube disposed between the first end and the second end, the linear tube defining at least one aperture therein; and
        at least one nozzle disposed through the at least one aperture defined by the linear tube, the at least one nozzle extending in a direction away from the linear tube and into the body of water,
    wherein the nanobubble generator, via the at least one nozzle, generates a plurality of hyperoxic nanobubbles and ejects the plurality of hyperoxic nanobubbles into the body of water, such that each of the plurality of hyperoxic nanobubbles forms an absorption and reaction site on a surface thereof to bind to a brevetoxin cell, thereby reducing brevetoxin growth and photosynthesis.

2. The system of claim 1, further comprising a plurality of apertures defined within the linear tube.

3. The system of claim 2, further comprising a plurality of nozzles, each of the plurality of nozzles disposed through one of the plurality of apertures defined within the linear tube.

4. The system of claim 3, wherein each of the plurality of nozzles includes a diameter of between 5 nanometers and 500 nanometers.

5. The system of claim 3, wherein each of the plurality of nozzles is angled with respect to the linear tube, the angle being between 45° and 135°.

6. The system of claim 1, wherein the first end and the second end of the system are spaced apart by a length of 10-1000 meters.

7. The system of claim 1, wherein at least one of the first end and the second end is disposed on at least one of the first shoreline and the second shoreline.

8. The system of claim 1, wherein the linear tube extends from the first end to the second end of the system.

9. The system of claim 1, wherein the linear tube includes a length of between 10 meters and 30 meters.

10. The system of claim 1, wherein the linear tube includes a first portion having a first diameter and a second portion having a second diameter, the second diameter being smaller than the first diameter, thereby creating a gradient from the first portion to the second portion of the linear tube.

11. The system of claim 1, further comprising a plurality of linear tubes disposed between the first end and the second end, each of the plurality of linear tubes defining at least one aperture therein, with a nozzle disposed through each of the at least one aperture of each of the plurality of linear tubes.

12. The system of claim 11, wherein each of the plurality of linear tubes is arranged proximate to at least one of the plurality of linear tubes, such that the plurality of linear tubes are arranged in a sequential series.

13. The system of claim 11, wherein at least one of the plurality of linear tubes is disposed within another of the plurality of linear tubes.

14. The system of claim 1, wherein each of the plurality of hyperoxic nanobubbles includes a diameter of between 40 nanometers and 300 nanometers.

15. The system of claim 1, wherein the nanobubble generator further comprises a pressure swing adsorption separation system that utilizes an air input and separates oxygen from nitrogen within the air input, thereby generating a high concentration hyperoxic oxygen nanobubble output.

16. The system of claim 1, further comprising a tank including an air mixture, the tank fluidically coupled to the nanobubble generator.

17. The system of claim 16, further comprising a pump intermediately secured to the tank and to the nanobubble generator, the pump configured to receive the air mixture from the tank and transmit the air mixture to the nanobubble generator.

18. The system of claim 16, wherein the tank is disposed on at least one of the first shoreline and the second shoreline.

19. The system of claim 1, wherein the nanobubble generator is stationary within the body of water.

20. The system of claim 1, further comprising a portable screening device disposed on at least one of the first shoreline and the second shoreline, the portable screening device in electronic communication with the nanobubble generator, the portable screening device including a Raman spectroscopy component to detect a presence of a brevetoxin within the body of water.

* * * * *